United States Patent
McGlynn

(10) Patent No.: US 12,296,274 B1
(45) Date of Patent: May 13, 2025

(54) PORTABLE GAMING CONSOLE HOLDER SYSTEM FOR RETAINING, STORING, AND GRIPPING THE PORTABLE GAMING CONSOLE AND METHODS OF MAKING AND USING SAME

(71) Applicant: Randell S. McGlynn, Mountain Top, PA (US)

(72) Inventor: Randell S. McGlynn, Mountain Top, PA (US)

( * ) Notice: Subject to any disclaimer, the term of this patent is extended or adjusted under 35 U.S.C. 154(b) by 0 days.

(21) Appl. No.: 18/909,639

(22) Filed: Oct. 8, 2024

Related U.S. Application Data

(63) Continuation of application No. 18/813,176, filed on Aug. 23, 2024, and a continuation of application No. 18/668,172, filed on May 18, 2024.

(51) Int. Cl.
*A63F 13/92* (2014.01)

(52) U.S. Cl.
CPC .................................... *A63F 13/92* (2014.09)

(58) Field of Classification Search
CPC ......................................................... A63F 13/92
See application file for complete search history.

(56) References Cited

U.S. PATENT DOCUMENTS

2012/0071248 A1* 3/2012 Hovseth ................. A63F 13/92
463/46

OTHER PUBLICATIONS

"Review: Retroid Pocket 3/3+ Grips and Hall Sensor Sticks" by Retro Game Corps published to YouTube to (https://www.youtube.com/watch?v=X6s_HNjL5Lk) on Mar. 15, 2023 (Year: 2023).*
PartTimeCAD Retroid Pocket 3 Clipshield Internet Archive at (https://web.archive.org/web/20221113175458/https://www.etsy.com/listing/1344865473/retroid-pocket-33-clipshield) retrieved Nov. 13, 2022 (Year: 2022).*
"Can you 3D Print a Good Retroid Pocket Case?" by Trendge published to YouTube at (https://www.youtube.com/watch?v=vGHUnL8VBCs) on Oct. 5, 2023 (Year: 2023).*

* cited by examiner

*Primary Examiner* — Peter J Iannuzzi
(74) *Attorney, Agent, or Firm* — James R. McDaniel; Lawrence P. Zale; Zale Patent Law, Inc.

(57) ABSTRACT

Systems, methods, and other embodiments for a portable gaming console holder system, including a portable gaming console having at least one first controller located on a front side of the portable gaming console, and a portable gaming console holding and storing apparatus for holding and storing the portable gaming console, wherein the portable gaming console holding and storing apparatus further includes; a frame, a base operatively connected to the frame, at least one recessed area located adjacent to the base for receiving the at least one controller, a portable gaming console retention device operatively connected to the frame, a first extension operatively connected to the frame and located across the frame from the portable gaming console retention device, and at least one ventilation opening located on the base.

17 Claims, 10 Drawing Sheets

PORTABLE GAMING CONSOLE HOLDER SYSTEM FOR RETAINING, STORING, AND GRIPPING THE PORTABLE GAMING CONSOLE AND METHODS OF MAKING AND USING SAME

CROSS REFERENCE TO RELATED APPLICATION

This application is a Continuation of U.S. patent application Ser. No. 18/668,172, filed May 18, 2024. This application is also a Continuation of U.S. patent application Ser. No. 18/813,176, filed Aug. 23, 2024. The disclosures of both of these applications are hereby incorporated by reference in their entirety to provide continuity of disclosure to the extent such disclosure is not inconsistent with this application.

FIELD OF THE INVENTION

The present invention relates to a portable gaming console holder system. In particular, the portable gaming console holder system is used to retain and store a portable gaming console and provide gripping areas for the user of the portable gaming console. The portable gaming console holder system is constructed with at least one recessed area that will allow gaming console controllers such as directional pads (D-pads), buttons, or other similar controllers on the portable gaming console to be located within the recessed area so that the portable gaming console is stored securely within the holder system. Also, the portable gaming console holder system includes a plurality of gripping areas located on the back of the holder system that will allow the user to ergonomically grip and manipulate the portable gaming console. Furthermore, the portable gaming console holder system includes a plurality of cutaway areas that can accommodate the trigger stacks located on the back of the portable gaming console. Finally, the portable gaming console holder system includes a slot located in the back that can be used to stand up the portable gaming console holder system in order to provide a more user-friendly experience when using the portable gaming console.

BACKGROUND OF THE INVENTION

It is known that portable gaming consoles were developed to allow the end users to more easily and efficiently play a video game. In particular, portable gaming consoles have been equipped with various controllers such as directional pads (D-pads), buttons, or other similar controllers that will allow the end user to play the video game. However, the known portable gaming consoles are not very ergonomic, which can cause the end user's hands and fingers to experience fatigue and soreness after a prolonged gaming session.

It is also known that grips have been developed for portable gaming consoles. These grips allow the portable gaming consoles to be attached to the grips to provide a more ergonomic user experience when the user is using the portable gaming console.

While the grips have been used to provide a more ergonomic user experience when the user is using the portable gaming console, these grips do not provide an adequate system for holding and storing the portable gaming console while the portable gaming console is not being used.

Finally, it is known to provide the known grips with devices that can be used to stand up or otherwise allow the portable gaming console to be placed on a table or other similar flat surface in order to allow the user to use the portable gaming console. In this manner, the end user does not have to continuously hold onto the portable gaming console and the grip. However, it is also known that these devices that can be used to stand up or otherwise allow the portable gaming console to be placed on a table or other similar flat surface can be easily broken or damaged. If the device is broken or damaged, the end user will then have to resort to going back to continuously holding the grip and the portable gaming console when using the portable gaming console.

In one embodiment, a purpose of this invention is to fulfill these and other needs in the portable gaming console holder and grip art in a manner more apparent to the skilled artisan once given the following disclosure.

The preferred portable gaming console holder system, according to various embodiments of the present invention, offers the following advantages: ease of use, portability, reduced cost, reduced weight, improved gripping of the portable gaming console, ease of attachment of the portable gaming console to the holder system; ease of removal of the portable gaming console from the holder system; improved ability to stand-up the portable gaming console; improved durability of the stand-up feature of the portable gaming console holder; and improved storing of the portable gaming console. In many of the preferred embodiments, these advantages are optimized to the extent that is considerably higher than previously achieved in prior known portable gaming console holders and grips.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

Figure 1:
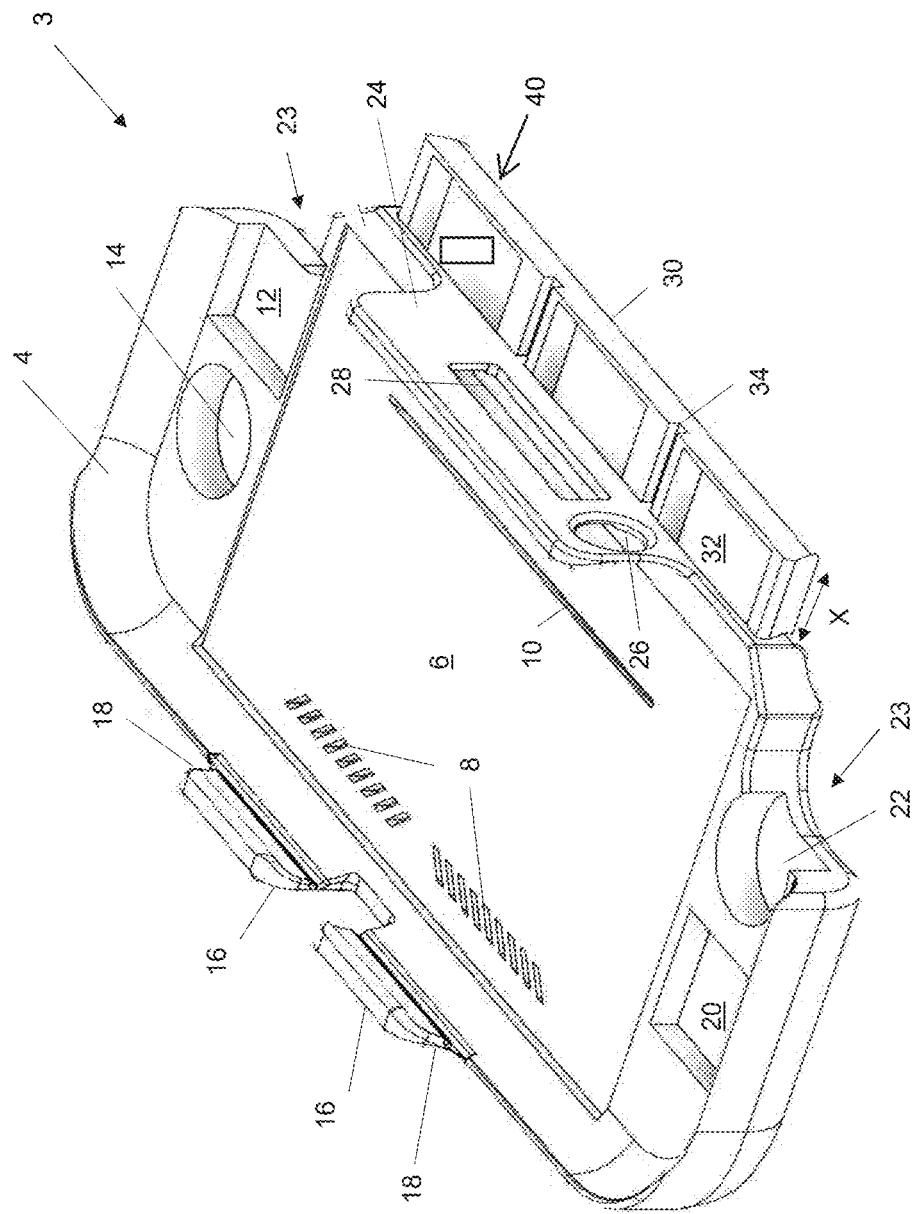
FIG. 1 is an isometric top view of a holder system for holding and storing a portable gaming console, constructed according to various embodiments of the present invention described herein.

The terminology used herein is to describe particular embodiments only and is not intended to be limiting to the invention. As used herein, the term "and/or" includes any and all combinations of one or more of the associated listed items. As used herein, singular forms "a", "an", and "the" are intended to include the plural forms as well as the singular forms unless the context clearly indicates otherwise. It will be further understood that the terms "comprises" and/or "comprising," when used in this specification, specify the presence of stated features, steps, operations, elements, and/or components but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefits, and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

A new and unique holder system for holding, storing, and gripping a portable gaming console and methods for making and using are discussed herein. In the following description, for purposes of explanation, numerous specific details are set forth to provide a thorough understanding of the present invention. It will be evident, however, to one skilled in the art that the present invention may be practiced without these specific details.

The present disclosure is considered an exemplification of the invention and is not intended to limit the invention to the specific embodiments illustrated by the figures or description below.

The present invention will now be described by referencing the appended figures representing preferred embodiments. FIGS. 1-10 are illustrations of a holder system for holding, storing, and gripping a portable gaming console.

In particular, as shown in FIGS. 1-10, there is illustrated portable gaming console holder system 2, which is capable of holding, storing, and gripping a portable gaming console 100. In particular, the portable gaming console holder system 2 includes, in part, portable gaming console holding and storing apparatus 3 and portable gaming console 100. Also, portable gaming console holding and storing apparatus 3 is constructed of any suitable, durable, high strength, rust resistant, UV resistant, lightweight material such as a polymeric or metallic material. Furthermore, in one embodiment, the portable gaming console holding and storing apparatus 3 is constructed using conventional techniques such as molding, forming, grinding, or the like.

Portable Gaming Console Holding and Storing Apparatus 3

Figure 2:
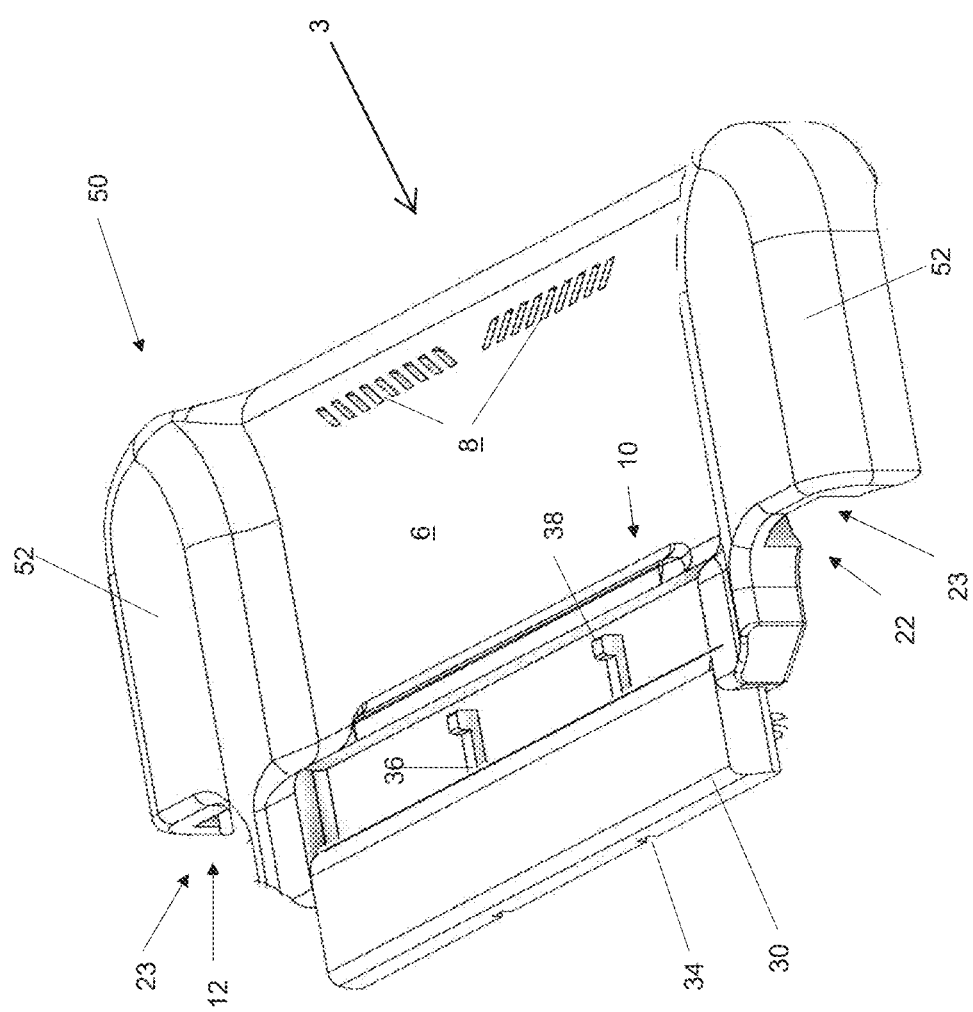
FIG. 2 is an isometric bottom view of the holder system for holding and storing a portable gaming console, constructed according to various embodiments of the present invention described herein.

With respect to portable gaming console holding and storing apparatus 3, attention is directed to FIGS. 1 and 2. As shown in FIGS. 1 and 2, in one embodiment, portable gaming console holding and storing apparatus 3 includes, in part, frame 4, base 6, ventilation openings 8, slot 10, recess 12, recess 14, extension 16, clip 18, recess 20, recess 22, cut-away areas 23, extension 24, audio jack opening 26, ventilation opening 28, game cartridge drawer 30, game cartridge holding areas 32, game cartridge drawer guide 34, game cartridge drawer rail 36, game cartridge rail stop 38, and reversible, ergonomic hand grip assembly 50.

A unique aspect of the present invention is that the portable gaming console holding and storing apparatus 3 is equipped with a game cartridge drawer 30 that will allow the end user to store a plurality of game cartridges 40 in the game cartridge drawer 30 so that the end-user has easily access to the game cartridges.

Another unique aspect of the present invention is the use of recesses 12, 14, 20, and 22. In particular, recesses 12, 14, 20, and 22 will allow the portable gaming console 100 to be easily and safely stored in the portable gaming console holding and storing apparatus 3, as will be discussed in greater detail later.

A still another unique aspect of the present invention is the use of cut-away areas 23. In particular, cut-away areas 23 create a space that allows the gaming console 100 to be securely retained within the portable gaming console holding and storing apparatus 3 by providing an opening for receiving the trigger stacks 116 (FIG. 3) on the portable gaming console 100. In this manner, the portable gaming console 100 can be securely retained within the portable gaming console holding and storing apparatus 3 while the end user is using the portable gaming console 100, as will be discussed in greater detail later.

A yet another unique aspect of the present invention is the use of extensions 16 and clips 18. In particular, the extensions 16 and clips 18 can be used to securely retain the portable gaming console 100 within the portable gaming console holding and storing apparatus 3 while the end user is using the portable gaming console 100 and while the portable gaming console 100 is being stored within the portable gaming console holding and storing apparatus 3, as will be discussed in greater detail later.

Still, another unique aspect of the present invention is the use of ventilation openings 8 and 28. In particular, ventilation openings 8 and 28 are located on the portable gaming console holding and storing apparatus 3 in order to allow the portable gaming console 100 to be properly ventilated. It is to be understood that depending upon portable gaming console 100, the ventilation openings 8 and 28 may be located at various locations on portable gaming console holding and storing apparatus 3 or may be omitted from portable gaming console holding and storing apparatus 3.

An even further unique aspect of the present invention is the use of slot 10. In particular, slot 10 allows the end user to insert a rigid card such as a credit card or the like into slot 10 in order to provide the end user with the capability of operating the portable gaming console 100 in a stand-up manner (FIG. 10), as will be discussed in greater detail later.

Figure 4:
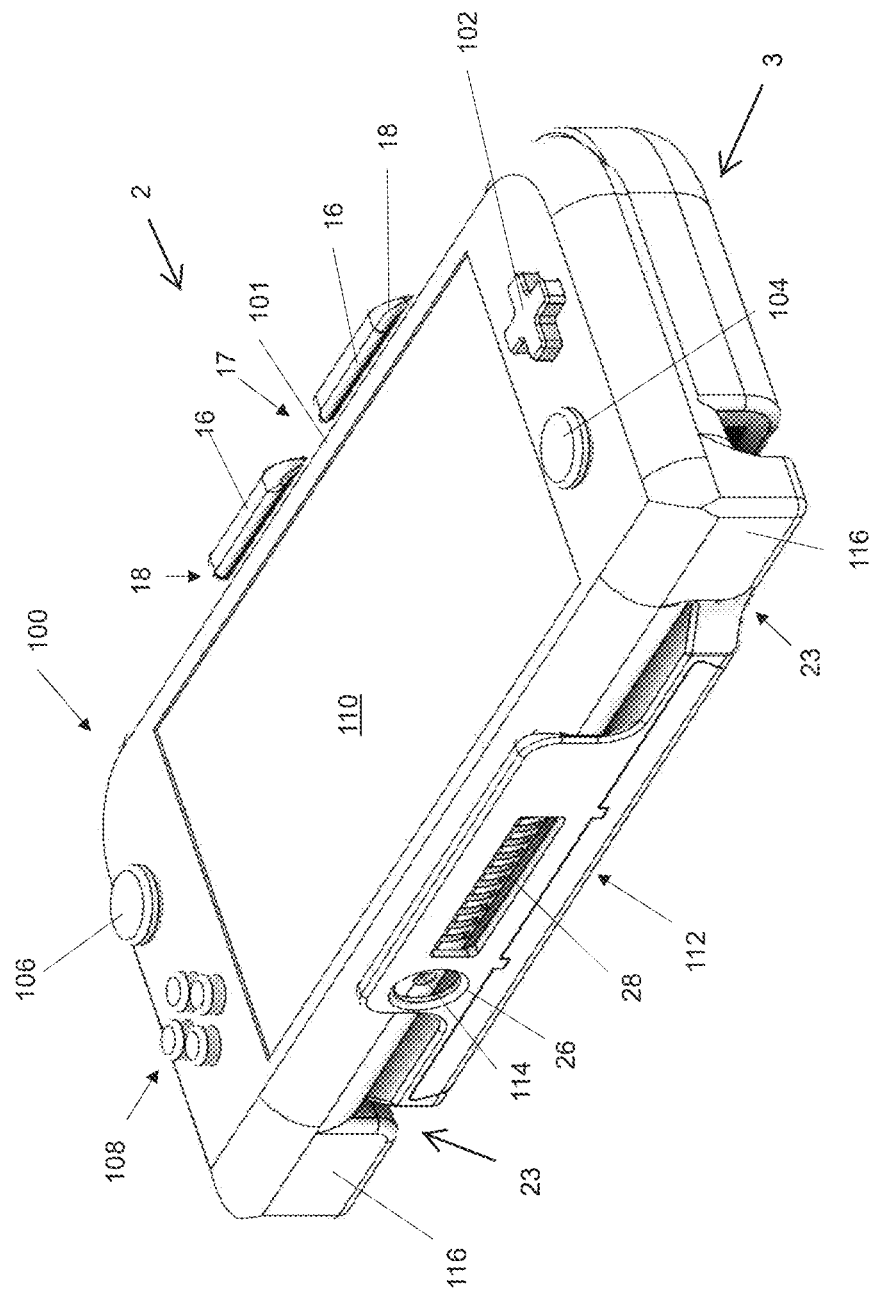
FIG. 4 is an isometric top view of the portable gaming console being retained by the holder system for holding a portable gaming console, according to various embodiments of the present invention described herein.
Figure 7:
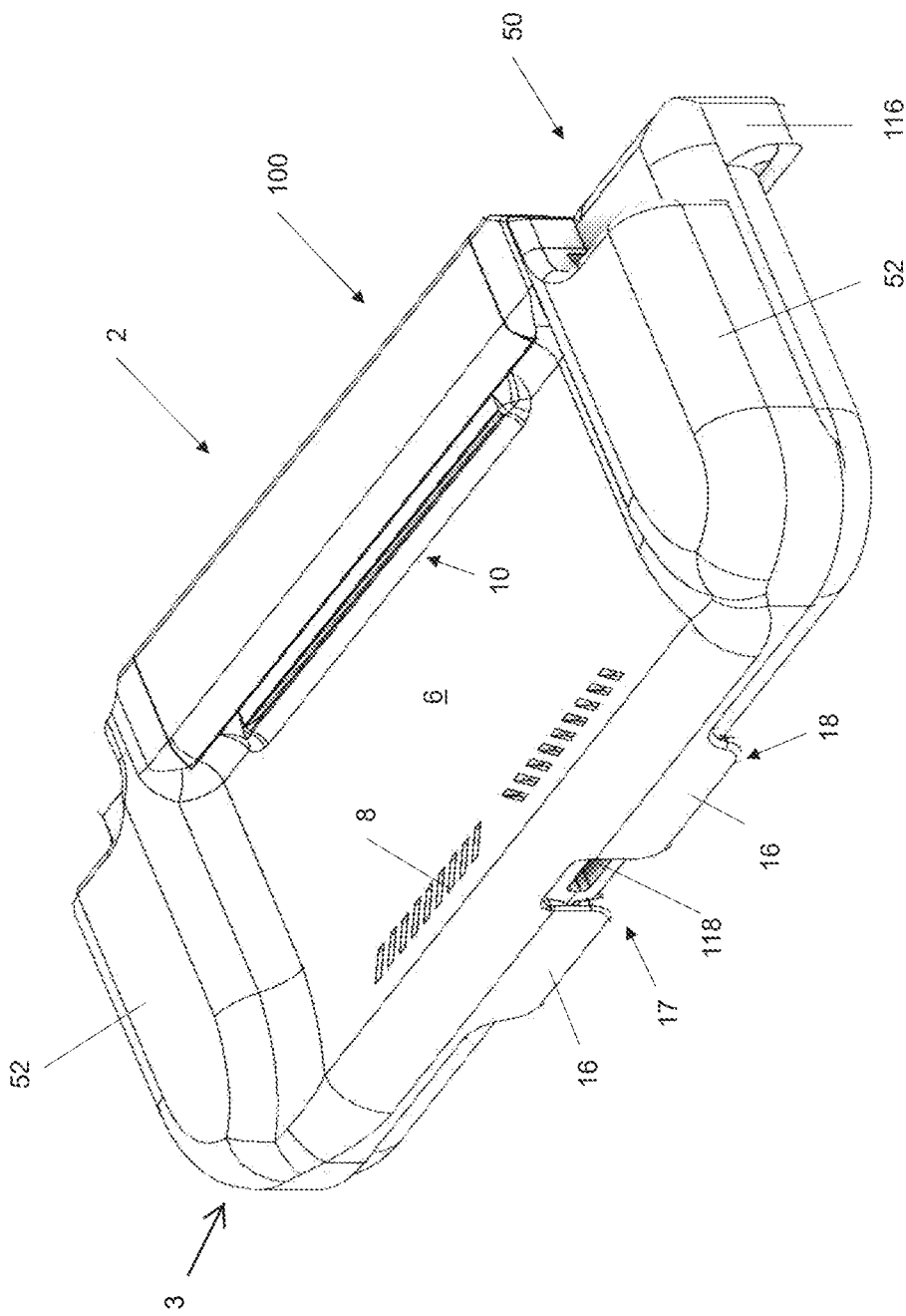
FIG. 7 is an isometric top view of the portable gaming console being stored within the holder system for storing a portable gaming console, according to various embodiments of the present invention described herein.

Another unique aspect of the present invention is the use of reversible, ergonomic hand grip assembly 50. In particular, reversible, ergonomic hand grip assembly 50 includes reversible, ergonomic hand grips 52 that allow the user to grip the portable gaming console holding and storing apparatus 3 and operate the portable gaming console 100. For example, when the portable gaming console holding and storing apparatus 3 is located over the front of the portable gaming console 100, the portable gaming console holding and storing apparatus 3 acts as a protective shield for the screen and controls on the portable gaming console 100 (FIG. 7). Conversely, when the portable gaming console holding and storing apparatus 3 is attached to the back of the portable gaming console 100, the reversible, ergonomic hand grips 52 can act as ergonomic grips (FIG. 4).

Portable Gaming Console 100

Figure 3:
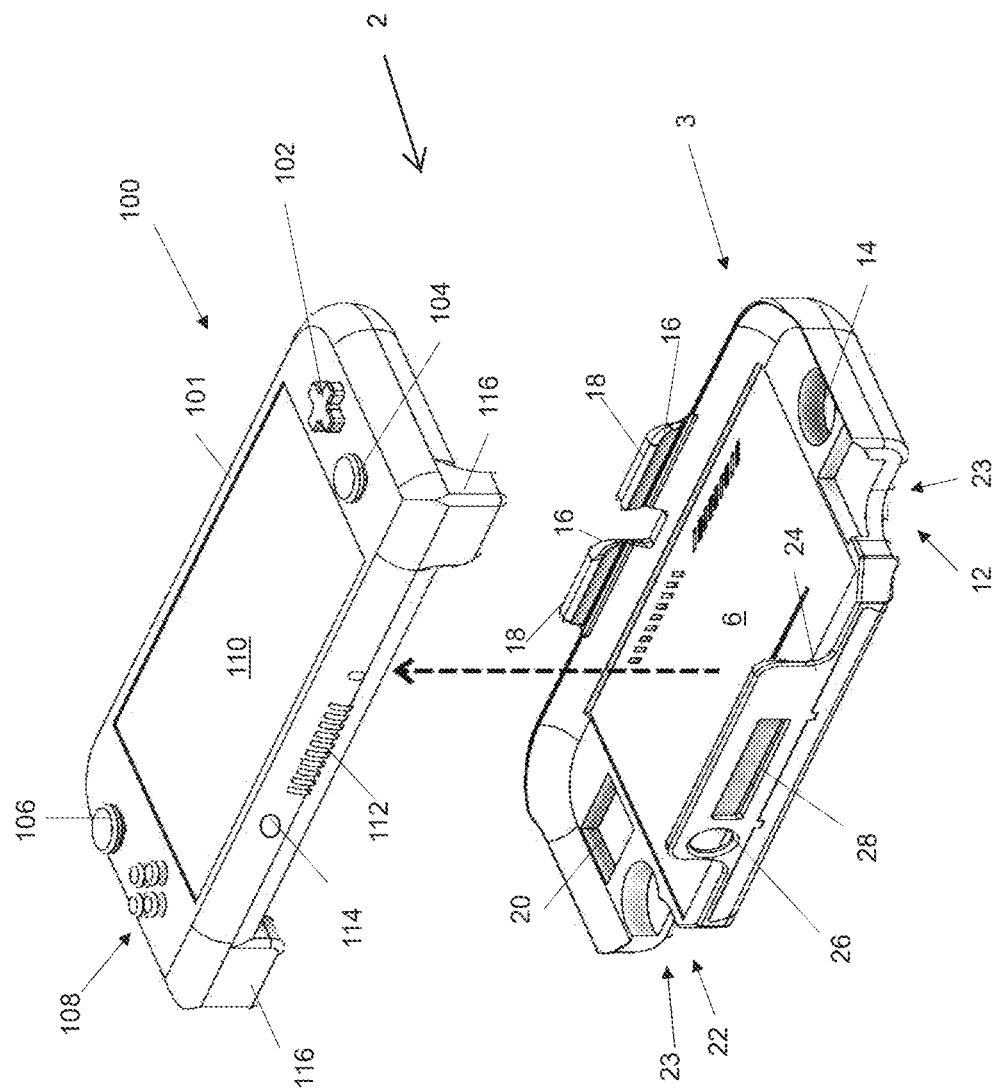
FIG. 3 is a schematic illustration of a portable gaming console being located over the holder system for holding a portable gaming console, according to various embodiments of the present invention described herein.

With respect to portable gaming console 100, in one embodiment, as shown in FIG. 3, portable gaming console 100 is a conventional gaming console that includes, in part, frame 101, directional pad 102, controllers 104, 106, and 108, display screen 110, ventilation openings 112, audio input 114, and trigger stacks 116.

As further shown in FIG. 3, portable gaming console holding and storing apparatus 3 can be used to securely retain portable gaming console 100 by locating portable gaming console holding and storing apparatus 3 under portable gaming console 100. In this manner, trigger stacks 116 are located over openings 23.

With respect to FIG. 4, portable gaming console 100 is shown as being retained within portable gaming console holding and storing apparatus 3. In particular, in one embodiment, portable gaming console 100 is placed within portable gaming console holding and storing apparatus 3 such that trigger stacks 116 are located within openings 23. The extensions 16 and clips 18 are forced over the top of the portable gaming console 100 so as to securely retain the portable gaming console 100 within the portable gaming console holding and storing apparatus 3 while the end user is using the portable gaming console 100. Also, the audio input 114 is located adjacent to opening 26 to allow the end user to insert a jack attached to a conventional audio device (not shown), such as headphones or the like, into the audio input 114. Finally, opening 28 allows for ventilation openings 112 in the portable gaming console 100 to properly ventilate the portable gaming console 100. It is to be understood that audio input 114 can be located at a variety of different locations on the portable gaming console 100. Furthermore, the audio input 114 does not have to be located adjacent to the ventilation openings 112.

Figure 5:
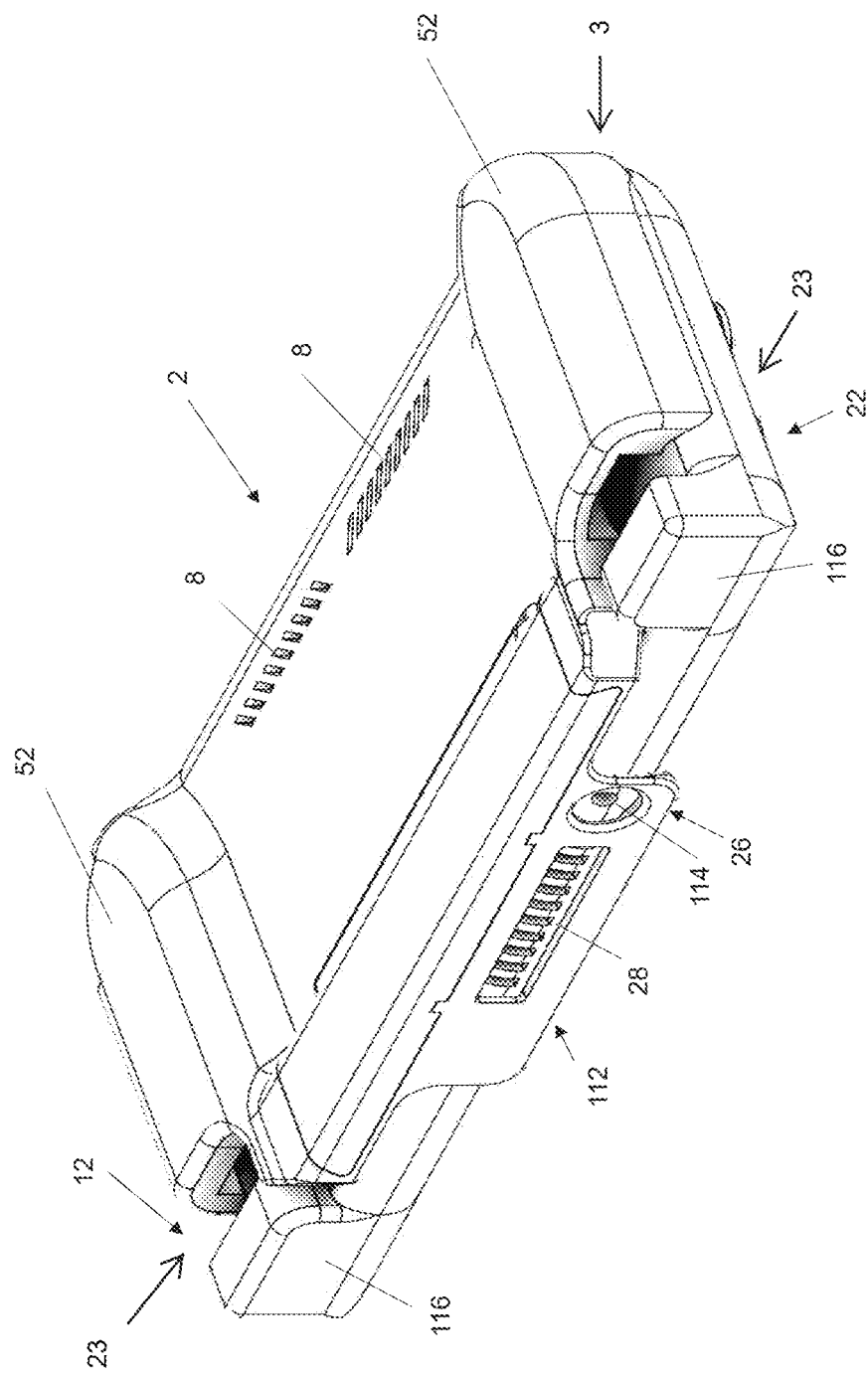
FIG. 5 is an isometric bottom view of the portable gaming console being retained by the holder system for holding a portable gaming console, according to various embodiments of the present invention described herein.

Regarding FIG. 5, there is illustrated a bottom view of the portable gaming console 100 being retained within portable gaming console holding and storing apparatus 3. As shown in FIG. 5, the trigger stacks 116 are located within openings 23. Also, the audio input 114 is located adjacent to opening 26 to allow the end user to insert a jack attached to a conventional audio device (not shown) into the audio input 114. Furthermore, the opening 28 allows for ventilation openings 112 in the portable gaming console 100 to properly ventilate the portable gaming console 100. Finally, the ventilation openings 8 will also provide a further way to ventilate the portable gaming console 100.

With respect to FIGS. 6-9, there is illustrated another unique aspect of the present invention. In particular, FIGS. 6-9 illustrate a new and unique system to store the portable gaming console 100 within the portable gaming console holding and storing apparatus 3 when the portable gaming console 100 is not being used.

Figure 6:
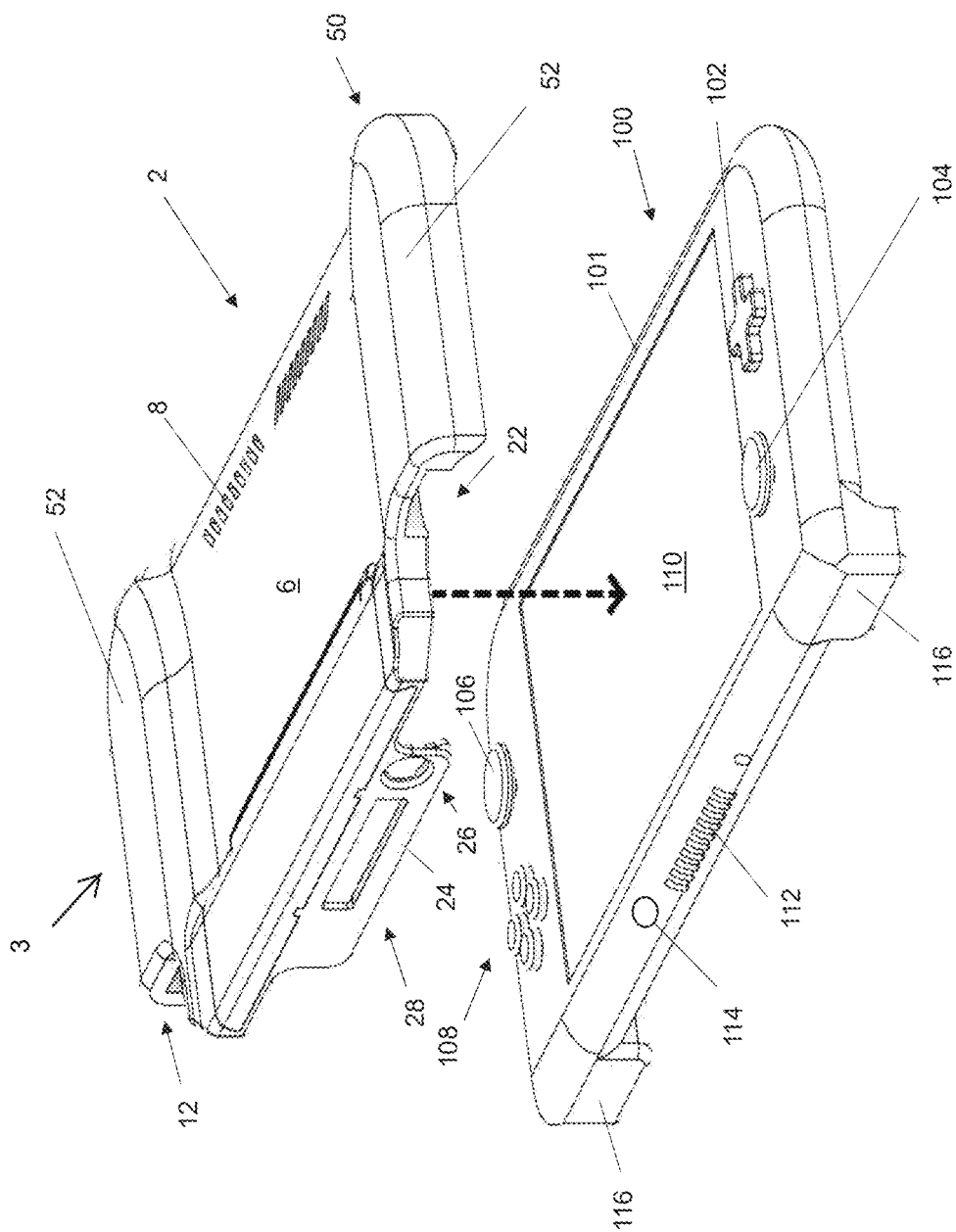
FIG. 6 is a schematic illustration of a portable gaming console being located under the holder system for storing a portable gaming console, according to various embodiments of the present invention described herein.
Figure 8:
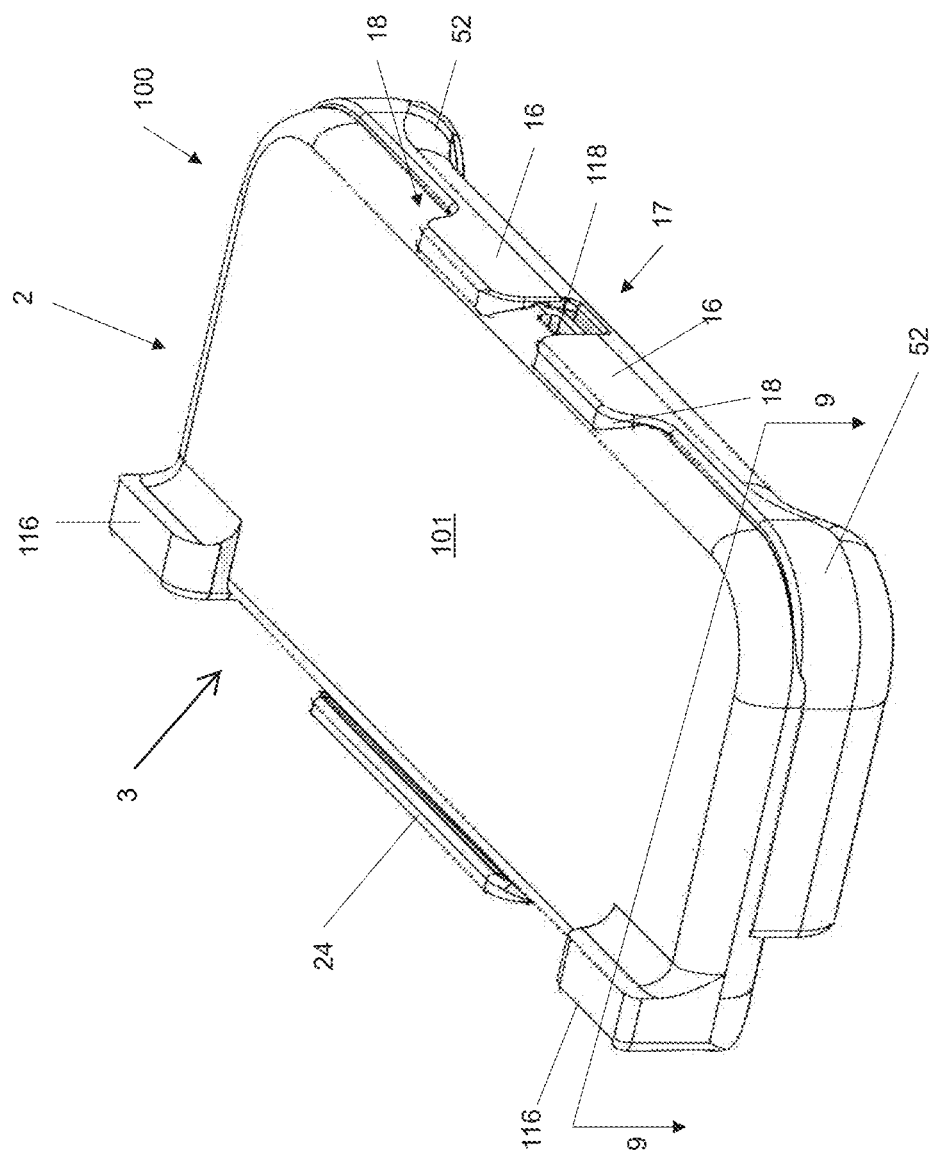
FIG. 8 is an isometric bottom view of the portable gaming console being stored within the holder system for storing a portable gaming console, according to various embodiments of the present invention described herein.

As shown in FIGS. 6-9, the portable gaming console holding and storing apparatus 3 is now located over the portable gaming console 100 (FIG. 6). The portable gaming console holding and storing apparatus 3 is then placed onto the top of the portable gaming console 100 so that extensions 16 and clips 18 securely store the portable gaming console 100 within portable gaming console holding and storing apparatus 3 (FIGS. 7 and 8).

Figure 9:
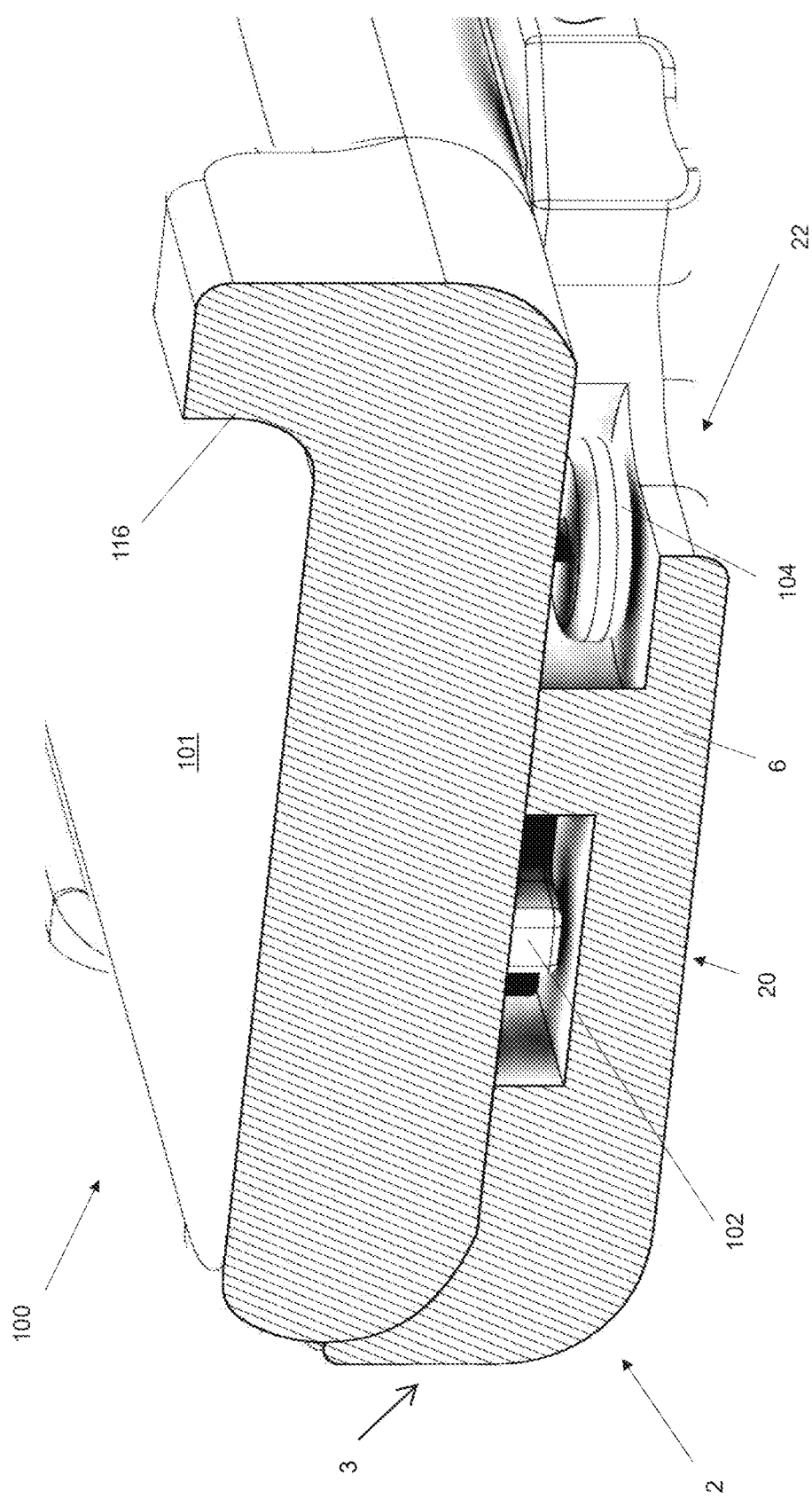
FIG. 9 is a cross-sectional view of the portable gaming console being stored within the holder system for storing a portable gaming console, taken along lines 9-9 in FIG. 8, according to various embodiments of the present invention described herein.

Regarding FIG. 9, another unique aspect of the present invention is the use of recesses 12, 14, 20, and 22 which allow the portable gaming console 100 to be easily and safely stored in the portable gaming console holding and storing apparatus 3. In particular, in one embodiment, recesses 12, 14, 20, and 22 are constructed in portable gaming console holding and storing apparatus 3 so that they will match up with the various directional pad 102 and controllers 104, 106, and 108, respectively, located on portable gaming console 100. As shown in FIG. 9, in one embodiment, recess 20 is sized and shaped so as to be able to accommodate directional pad 102 and recess 22 is sized and shaped so as to be able to accommodate controller 104. It is to be understood that the size, shape, and location of each of the recesses can be changed in order to accommodate the sizes, shapes, and locations of the various directional pad 102 and controllers 104, 106, and 108 located on portable gaming console 100. The key aspect being that when the portable gaming console 100 is stored within the portable gaming console holding and storing apparatus 3, the display screen 110, the directional pad 102, and controllers 104, 106, and 108 are all properly protected from being damaged.

Figure 10:
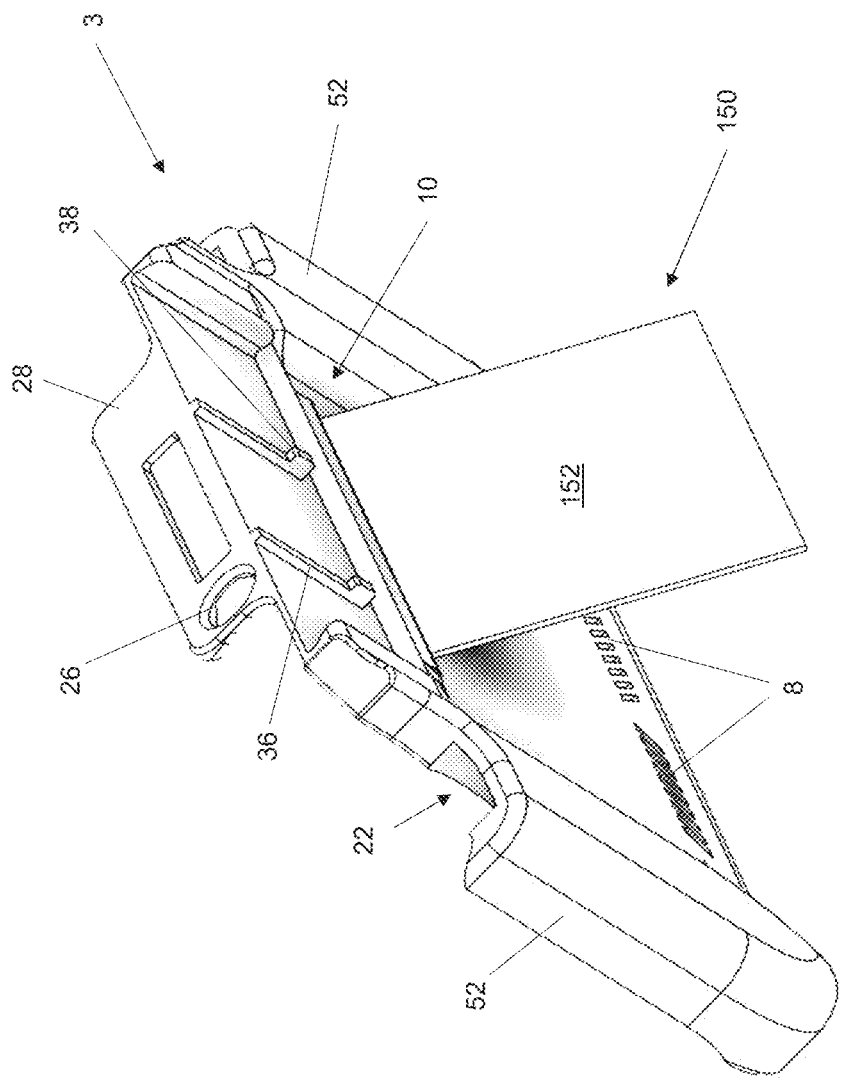
FIG. 10 is an isometric rear view of the holder system for holding and storing a portable gaming console showing the portable gaming console stand-up device, constructed according to various embodiments of the present invention described herein.

Regarding FIG. 10, there is illustrated another unique aspect of the present invention. In particular, in one embodiment, there is illustrated a stand-up assembly 150. As shown in FIG. 10, if the end user desires to operate the portable gaming console 100 in a stand-up mode, the end user can insert a rigid card 152 such as a credit card or the like into the slot 10. In this manner, the stand-up assembly 150 can be used to quickly and easily convert portable gaming console 100 into a stand-up mode.

Using the Portable Gaming Console Holder System 2

With respect to using the portable gaming console holder system 2 so that portable gaming console holding and storing apparatus 3 is used to hold the portable gaming console 100 while the end user is playing a video game on the portable gaming console 100, attention is directed to FIGS. 3-5. As discussed earlier, in order to use the portable gaming console holding and storing apparatus 3 to hold the portable gaming console 100 while the portable gaming console 100 is being used, the end user orients the portable gaming console 100 so that the portable gaming console holding and storing apparatus 3 is located under the portable gaming console 100 (FIG. 3). The end user then locates the portable gaming console 100 within the portable gaming console holding and storing apparatus 3 so that the clips 18 are located over the portable gaming console 100 (FIG. 4), as discussed earlier. In this manner, the end user will be able to access the audio input 114. Also, the ventilation openings 112 on portable gaming console 100 can be accessed by the opening 28. Finally, the trigger stacks 116 on portable gaming console 100 are located within openings 23. As shown in FIG. 5, as discussed earlier, ventilation openings 8 will also provide additional ventilation for the portable gaming console 100.

Once the end user has finished playing a game on the portable gaming console 100 and wants to play a different game on the portable gaming console 100, the end user can then open the game cartridge drawer 30 by sliding the game cartridge drawer 30 in the direction of arrows X (FIG. 1) through the interaction between game cartridge drawer guides 34 and game cartridge drawer rails 36 (FIG. 2). The end user can then select the desired new game cartridge 40 from one of the game cartridge holding areas 32 and place the previously used game cartridge in one of the game cartridge holding area 32. The end user can then slide the game cartridge drawer 30 along the direction of arrows "X" in order to close the game cartridge drawer 30.

Another unique aspect of the present invention is the use of game cartridge rail stop 38 (FIG. 2). In one embodiment, game cartridge rail stop 38 is constructed so as to not allow the end user to inadvertently pull out the game cartridge 30 too far so that the game cartridge drawer 30 becomes disconnected from the portable gaming console holding and storing apparatus 3.

After the end user has finished using the portable gaming console 100, the portable gaming console 100 can then be stored within the portable gaming console holding and storing apparatus 3. As shown in FIGS. 6-9, the portable gaming console holding and storing apparatus 3 is now located over the portable gaming console 100 (FIG. 6), as discussed earlier. The portable gaming console holding and storing apparatus 3 is then placed onto the top of the portable gaming console 100 so that extensions 16 and clips 18 can be used to securely store the portable gaming console 100 within portable gaming console holding and storing apparatus 3 (FIGS. 7 and 8).

Regarding FIG. 9, as discussed above, recesses 12, 14, 20, and 22 allow the portable gaming console 100 to be easily and safely stored in the portable gaming console holding and storing apparatus 3. In particular, recesses 12, 14, 20, and 22 are constructed in portable gaming console holding and storing apparatus 3 so that they will match up with the various directional pad 102 and controllers 104, 106, and 108 located on portable gaming console 100. In this manner, portable gaming console 100 can be quickly and easily stored within portable gaming console holding and storing apparatus 3.

While it has not been mentioned, one familiar with the art would realize that the device is not limited by the materials used to create each apparatus that comprises the invention. Any other material type can comprise some or all of the elements in constructing a portable gaming console holder system, according to various embodiments of the present invention.

Although the present invention has been illustrated and described herein with reference to preferred embodiments and specific examples, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A portable gaming console holder system for holding and storing a portable gaming console, comprising:

a portable gaming console having at least one first controller located on a front side of the portable gaming console; and a one-piece, reversible portable gaming console holding and storing apparatus for holding and storing the portable gaming console, wherein the one-piece, reversible portable gaming console holding and storing apparatus further comprises, a base, a frame operatively connected to a peripheral portion of the base, at least one recessed area located adjacent to a first end of the base for receiving the at least one controller, a portable gaming console retention device operatively connected to the frame, a first extension operatively connected to the base and located across from the portable gaming console retention device, at least one reversible, protruding hand grip located adjacent to the first end of the base and wherein the least one reversible, rounded, protruding hand grip is located under the least one recessed area, at least one ventilation opening located on the base, wherein the ventilation opening is located adjacent to the portable gaming console and wherein the at least one ventilation opening is configured to assist in ventilating the portable gaming console, a game cartridge drawer located on a back side of the one-piece, reversible portable gaming console holding and storing apparatus, at least one game cartridge holding area located on a first side of the game cartridge drawer, at least one game cartridge drawer guide located on a second side of the game cartridge drawer, at least one game cartridge drawer rail operatively connected to the back side of the one-piece, reversible portable gaming console holding and storing apparatus, and a game cartridge rail stop located on one end of the at least one game cartridge drawer rail.

2. The portable gaming console holder system, according to claim 1, wherein the portable gaming console further comprises:

a directional pad located on the front side of the portable gaming console;

a display screen located on the front side of the portable gaming console;

an audio input located on the portable gaming console; and a plurality of trigger stacks that extend towards a back side of the portable gaming console.

3. The portable gaming console holder system, according to claim 2, wherein the one-piece, reversible portable gaming console holding and storing apparatus further comprises:

a plurality of cut-away areas, wherein each of the plurality of cut-away areas is located adjacent to the first end and a second end of the base and each of the plurality of cut-away areas is located adjacent to the at least one recessed area, wherein each of the plurality of cut-away areas is configured to receive each of the plurality of trigger stacks in order to allow for a surface of the portable gaming console to be flush with the one-piece, reversible portable gaming console holding and storing apparatus when the portable gaming console is attached to the one-piece, reversible portable gaming console holding and storing apparatus.

4. The portable gaming console holder system, according to claim 2, wherein the first extension further comprises:
   another ventilation opening located on the first extension, wherein the another ventilation opening is capable of being located adjacent to the portable gaming console and wherein the another ventilation opening is configured to assist in ventilating the portable gaming console; and
   an audio jack opening located on the one-piece, reversible portable gaming console holding and storing apparatus, wherein the audio jack opening is capable of being located adjacent to the audio input.

5. The portable gaming console holder system, according to claim 1, wherein the portable gaming console retention device further comprises:
   at least one second extension operatively connected to the frame; and
   at least one clip operatively connected to the at least one second extension.

6. The portable gaming console holder system, according to claim 1, wherein the one-piece, reversible portable gaming console holding and storing apparatus is further comprised of:
   a slot located on the base, wherein the slot is configured to assist in operating the portable gaming console in a stand-up mode.

7. A method of making a portable gaming console holder system for holding and storing a portable gaming console, comprising:
   a portable gaming console having at least one first controller located on a front side of the portable gaming console; and
   removably attaching a one-piece, reversible portable gaming console holding and storing apparatus to the portable gaming console, wherein the one-piece, reversible portable gaming console holding and storing apparatus further comprises,
   a frame,
   attaching a base to the frame,
   locating at least one recessed area adjacent to a first end of the base for receiving the at least one controller,
   connecting a portable gaming console retention device to the frame,
   connecting a first extension to the base, wherein the first extension is located across from the portable gaming console retention device,
   locating at least one reversible, protruding hand grip adjacent to the first end of the base, wherein the least one reversible, rounded, protruding hand grip is also located under the least one recessed area,
   locating at least one ventilation opening on the base, wherein the ventilation opening is located adjacent to the portable gaming console and wherein the at least one ventilation opening is configured to assist in ventilating the portable gaming console,
   locating a game cartridge drawer on a back side of the one-piece, reversible portable gaming console holding and storing apparatus,
   locating at least one game cartridge holding area on a first side of the game cartridge drawer,
   locating at least one game cartridge drawer guide on a second side of the game cartridge drawer,
   connecting at least one game cartridge drawer rail to the back side of the one-piece, reversible portable gaming console holding and storing apparatus, and
   locating a game cartridge rail stop on one end of the at least one game cartridge drawer rail.

8. The method, according to claim 7, wherein the portable gaming console further comprises:
   locating a directional pad on the front side of the portable gaming console;
   locating a display screen on the front side of the portable gaming console;
   locating an audio input on the portable gaming console; and
   locating a plurality of trigger stacks on the portable gaming console such that the plurality of trigger stacks extend towards a back side of the portable gaming console.

9. The method, according to claim 8, wherein the removably attaching a one-piece, reversible portable gaming console holding and storing apparatus further comprises:
   locating a plurality of cut-away areas, wherein each of the plurality of cut-away areas is located adjacent to the first end and a second end of the base and each of the plurality of cut-away areas is located adjacent to the at least one recessed area, and wherein each of the plurality of cut-away areas is configured to receive each of the plurality of trigger stacks in order to allow for a surface of the portable gaming console to be flush with the one-piece, reversible portable gaming console holding and storing apparatus when the portable gaming console is attached to the one-piece, reversible portable gaming console holding and storing apparatus.

10. The method, according to claim 8, wherein the connecting a first extension further comprises:
    locating another ventilation opening on the first extension, wherein the another ventilation opening is capable of being located adjacent to the portable gaming console, and wherein the another ventilation opening is configured to assist in ventilating the portable gaming console; and
    locating an audio jack opening on the one-piece, reversible portable gaming console holding and storing apparatus, wherein the audio jack opening is capable of being located adjacent to the audio input.

11. The method, according to claim 7, wherein the connecting a portable gaming console retention device further comprises:
    connecting at least one second extension to the frame; and
    connecting at least one clip to the at least one second extension.

12. A method of using a portable gaming console holder and storing system for holding and storing a portable gaming console, comprising:
    a portable gaming console having at least one first controller located on a front side of the portable gaming console; and
    removably attaching a one-piece, reversible portable gaming console holding and storing apparatus to the portable gaming console in order to hold and store the portable gaming console, wherein the portable gaming console holding and storing apparatus further comprises,
    a frame,
    a base operatively connected to the frame,
    at least one recessed area located adjacent to a first end of the base for receiving the at least one controller,
    a portable gaming console retention device operatively connected to the frame,
    a first extension operatively connected to the base and located across from the portable gaming console retention device, at least one reversible, protruding hand grip located adjacent to the first end of the base and wherein the least one reversible, rounded, protruding hand grip is located under the least one recessed area, at least one ventilation opening located on the base, wherein the ventilation opening is located adjacent to the portable gaming console and wherein the at least one ventilation opening is configured to assist in ventilating the portable gaming console, a game cartridge drawer, wherein the game cartridge drawer is located on a back side of the one-piece, reversible portable gaming console holding and storing apparatus;

at least one game cartridge holding area, wherein the at least one game cartridge holding area is located on a first side of the game cartridge drawer;

at least one game cartridge drawer guide, wherein the at least one game cartridge drawer guide is located on a second side of the game cartridge drawer;

at least one game cartridge drawer rail, wherein the at least one game cartridge drawer rail is operatively connected to the back side of the one-piece, reversible portable gaming console holding and storing apparatus; and a game cartridge rail stop, wherein the game cartridge rail stop is located on one end of the at least one game cartridge drawer rail.

13. The method, according to claim 12, wherein the portable gaming console further comprises:

a directional pad, wherein the directional pad is located on the front side of the portable gaming console;

a display screen, wherein the display screen is located on the front side of the portable gaming console;

an audio input, wherein the audio input is located on the portable gaming console; and a plurality of trigger stacks, wherein the plurality of trigger stacks extend towards a back side of the portable gaming console.

14. The method, according to claim 13, wherein the one-piece, reversible portable gaming console holding and storing apparatus further comprises:

a plurality of cut-away areas, wherein each of the plurality of cut-away areas is located adjacent to the first end and a second end of the base and each of the plurality of cut-away areas is located adjacent to the at least one recessed area, and wherein each of the plurality of cut-away areas is configured to receive each of the plurality of trigger stacks in order to allow for a surface of the portable gaming console to be flush with the one-piece, reversible portable gaming console holding and storing apparatus when the portable gaming console is attached to the one-piece, reversible portable gaming console holding and storing apparatus.

15. The method, according to claim 13, wherein the first extension further comprises:

another ventilation opening, wherein the another ventilation opening is located on the first extension, wherein the another ventilation opening is capable of being located adjacent to the portable gaming console, and wherein the another ventilation opening is configured to assist in ventilating the portable gaming console; and an audio jack opening, wherein the audio jack opening is located on the one-piece, reversible portable gaming console holding and storing apparatus, wherein the audio jack opening is capable of being located adjacent to the audio input.

16. The method, according to claim 12, wherein the portable gaming console retention device further comprises:

at least one second extension, wherein the least one second extension is operatively connected to the frame; and at least one clip, wherein the at least one clip is operatively connected to the at least one second extension.

17. The method, according to claim 12, wherein the one-piece, reversible portable gaming console holding and storing apparatus is further comprised of:

a slot located on the base, wherein the slot is configured to assist in operating the portable gaming console in a stand-up mode.

* * * * *